Jan. 28, 1964     I. B. MARGILOFF     3,119,348
VARIABLE SPEED CONVEYOR SYSTEM
Filed May 16, 1961     2 Sheets-Sheet 1
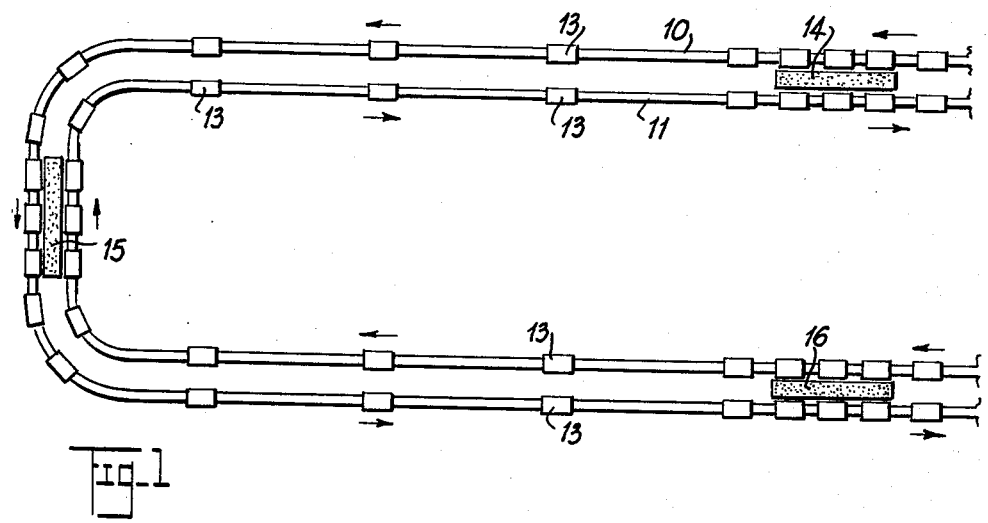
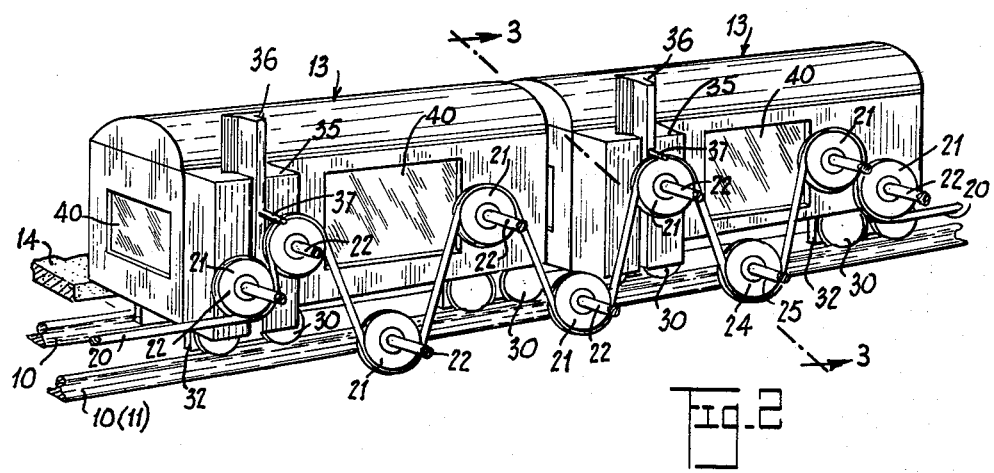
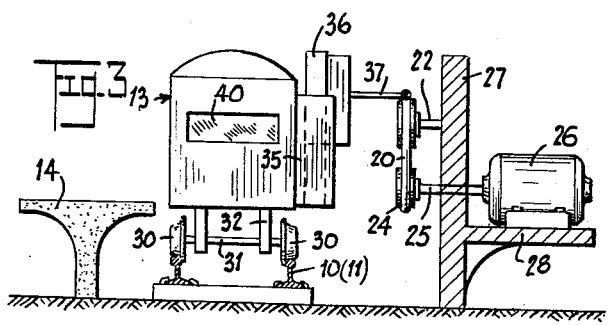
INVENTOR.
IRWIN B. MARGILOFF
BY William A. Drucker
ATTORNEY.

Jan. 28, 1964  I. B. MARGILOFF  3,119,348
VARIABLE SPEED CONVEYOR SYSTEM
Filed May 16, 1961  2 Sheets-Sheet 2

INVENTOR.
IRWIN B. MARGILOFF
BY
William A. Drucker
ATTORNEY

United States Patent Office 3,119,348
Patented Jan. 28, 1964

3,119,348
VARIABLE SPEED CONVEYOR SYSTEM
Irwin B. Margiloff, 201 E. 19th St., New York 3, N.Y.
Filed May 16, 1961, Ser. No. 110,560
13 Claims. (Cl. 104—173)

This invention relates in general to conveyor systems and, more particularly, to conveyor systems having separate units which move at varying rates of speed about a confined path.

In conveyor systems in common use, such as rail systems, subways, and the like, the rail cars need not come to a complete stop to allow the entry and exit of passengers or the loading and discharging of goods. Such loading and unloading may be accomplished while the rail cars move very slowly past a loading station. The cars must then be accelerated to higher rates of speed between terminal points so that goods or passengers may be rapidly transported.

Rail transportation of heavy traffic on a single right-of-way is limited by the problem of avoiding collisions between the transporting units operating at small headways and controlled independently.

In conveyor systems the problem has always been that of maintaining a relatively high speed between entry and exit points but simultaneously allowing the transfer or loading to take place at slow speeds. This has been solved by the use of accelerating and decelerating conveyors, which allow passengers, for instance, to transfer from a standstill to successively faster conveyors so that the passengers may reach their destinations more promptly than if they were to ride a conveyor moving at a speed to which they might transfer comfortably from a stationary point. Many ingenious devices have been proposed to make the transfers to and from higher-speed conveyors more convenient.

It is, therefore, an object of this invention to provide a rail system having terminal points and means to drive rail cars slowly past the terminal points and then rapidly between them.

Another object of this invention is to provide means to avoid collisions between cars operating on a closed loop single right-of-way rail line while permitting the individual rail cars to operate at minimum headways.

Yet another object of this invention is to provide an apparatus which renders continuously available transportation between terminal points and is driven by a constant speed cable or rotating shaft.

Still another object of this invention is to provide a conveyor system having separate moving components which move rapidly over a given path and move slowly past at least one terminal point.

A further object of this invention is to provide a conveyor system having several separately movable units, at least one drive screw having a pitch which varies from one portion to another, and mechanisms extending from each separately movable unit engaged by the drive screw threads so that separately movable units are moved about the conveyor system at varying rates of speed according to the pitch of the portion of the drive screw engaged by the mechanism of each unit.

A still further object of this invention is to provide a conveyor system having separately movable units, a moving constant speed cable adjacent to the conveyor system, the moving cable describing a serpentine path adjacent to at least a portion of the conveyor system, and a mechanism connecting each unit of the conveyor system to the moving cable so that each unit is moved slowly along the conveyor system where the moving cable describes a serpentine path and each unit is moved more rapidly about the conveyor system at the constant speed of the cable where the moving cable runs parallel to the conveyor system.

Many other objects, advantages and features of invention reside in the construction, arrangement, and combination of parts involved in the embodiments of my invention and its practice as will be understood from the following description and accompanying drawing wherein:

FIG. 1 is a plan view of a fragment of a loop of a conveyor system having two sets of tracks on which cars move in different directions past terminal points or stations at a very low speed; after which the cars move at a higher speed between the terminals;

FIG. 2 is a perspective view of two cars being moved slowly past a terminal by a moving belt or cable describing a serpentine path;

FIG. 3 is a view taken on line 3—3 of FIG. 2;

Figure 4:
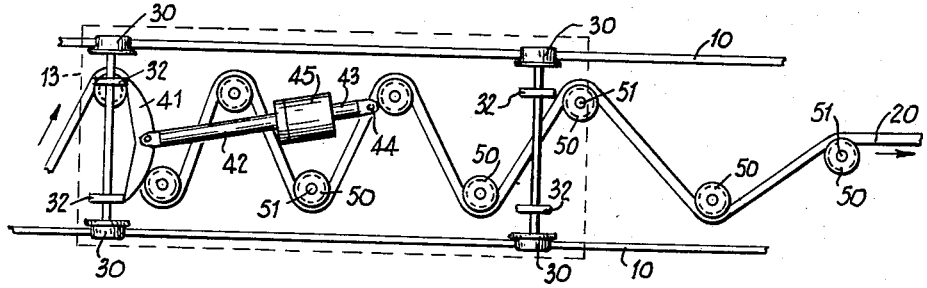
FIG. 4 is a top view of a second embodiment of my invention, with the body of a car shown in dotted lines.

In general the invention embodies conveyances connected to a constant speed drive such as a chain, belt or cable on one hand or a rotating shaft on the other. Transportation units are connected to the drive at selected intervals. The drive therefore keeps the units, such as cars, chairs, platforms, hooks or the like, at fixed distances apart along the length of the drive and avoids collisions as well as driving the units. The vector quantity of velocity along the direction of forward motion of the cars is at a maximum between stations. In the station area the vector of velocity of drive decreases in this direction as part of the vector is diverted into spiral or lateral reciprocal motion, for example, or into a devious path. Thus, when the drive is coiled or slightly helical, the tighter the helix the slower the car traverses the tight portion, and the more extended the helix the faster the straight line motion of the car becomes. The invention therefore embraces a means of driving a unit fixed to a constant speed external moving cable or the like so that the unit varies in speed in a selected forward direction as part of the forward motion of the drive cable is diverted into movement in another direction. This diversion occurs in loading and discharge zones. The cars tend to bunch up in these zones and string out along the high speed right-of-way.

Referring to the drawing in detail, FIG. 1 shows portions of two loops 10 and 11 of track on which cars 13 move. The stations or terminal points 14, 15 and 16 are disposed between the loops 10 and 11 as are stations of a subway system, an elevated train system, a conveyor belt, moving sidewalk, or the like. While they are in service, the cars 13 move about the loops 10 and 11 of track without stopping. In order to disembark and load passengers, freight or the like, the cars 13 move very slowly past the station platforms 14, 15 and 16. However, so that an unnecessarily long time will not be consumed while the cars are moving between terminal points, the cars 13 are accelerated and move more rapidly between the terminal points. They are close together when moving slowly and spread out when moving rapidly. The station may, therefore, always be full of cars.

Referring now to FIGS. 2 and 3, the cars 13 in my conveyor system are driven as follows. A cable, chain or belt 20 is disposed parallel to each track 10 or 11 and is supported by suitable pulleys disposed along the right-of-way. It may be above, below or alongside the cars. As shown in FIG. 2, adjacent to each loading platform or terminal point 14, the belt 20 passes in a serpentine fashion about idler pulleys 21, for example, which rotate freely about support shafts 22.

As shown in FIG. 3, the support shafts 22 may be journaled in a wall 27 or any other suitable support means. In order to drive the belt 20 parallel to the tracks, a drive pulley 24 may be mounted on a shaft 25 which is driven by a motor 26. The motor 26 is mounted on a shelf 28 which is secured to a wall 27. Therefore, one or more motors 26 and pulleys 24 will drive the belt 20 parallel to the tracks along the right-of-way between the terminal points. Approaching and adjacent to the terminal points, the belt 20 describes the serpentine path shown in FIG. 2.

Referring further to FIGS. 2 and 3, the cars 13 rest on standard railroad type wheels 30 which are joined by axles 31. The axles 31 are rotatably secured below the cars 13 by downward projections 32 or other conventional means. Fixed to the side of each car disposed towards the belt 20 is a vertical way 35. Disposed to slide vertically within each way 35 is a sliding member 36 having an extension 37, the end of which connects to the belt 20.

Therefore, as each car 13 moves along the right-of-way and the belt 20 runs parallel to the tracks 10 or 11, the member 36 remains stationary within the way 35 and the cars 13 are drawn along at the same speed as the belt 20 is moving. As the cars 13 approach a terminal point 14, the member 37 follows the serpentine path of the belt 20 sliding the member 36 up and down within the way 35. If 30 feet of belt 20 are required to describe a serpentine path along 10 feet of track, the average velocity of the cars 13 along the track adjacent the serpentine path of the belt 20 will be one-third the velocity of the belt 20 in this region. Thus, this particular belt or cable drive moves the cars rapidly along the right-of-way and more slowly past the terminal points even though it itself moves at the same constant speed in both regions.

Although deceleration may be fairly rapid as the serpentine path region of the belt 20 is reached, the way 35 may be spring mounted, for example, to absorb such shocks. Also, the belt 20 may be of a somewhat elastic material to absorb such shocks.

As the belt 20 passes directly above or below each pulley 21, its momentary horizontal component of velocity will be that of the speed of the belt. Thus the belt 20 will tend to jerk each car 13 slightly as it passes directly above and below each pulley 21. However, these slight shocks or jerks may be minimized by reducing the size of the pulleys 21 as much as possible and by suitably shock mounting the ways 35.

While I have shown the first embodiment of my invention used in connection with rail cars 13 which are shown as passenger carrying cars having windows 40, it is nevertheless to be understood that this and the other embodiments of my invention may equally well be applied to freight handling systems, moving conveyor systems such as overhead hooks, amusement devices such as the small passenger cars which pass through darkened buildings in which there are exhibited illuminated scenes, segmented pedestrian conveyor sidewalks, escalators, the skip cars which feed a blast furnace, flat cars, ski lifts, funicular railways, mountain cable car ways, or any other suitable application.

Figure 5:
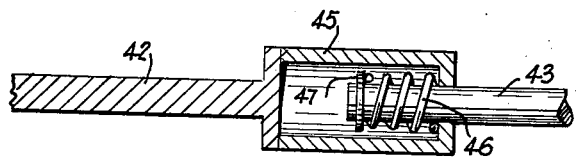
FIG. 5 is a longitudinal section through a shock absorbing connecting bar used with the second embodiment of my invention.

Referring now to FIGS. 4 and 5, a second embodiment of my invention has each car 13 fixed above the wheels 30 which are secured below the car 13 by downward projections 32 or other suitable means. The rearmost downward projections 32 have fixed to and extending between them a yoke 41 which has pivotally fixed to it an arm 42. The front portion 43 of the arm 42 connects to the moving belt 20 by a downward projection 44.

Referring now to FIG. 5, arm 42 has an enlarged cylindrical portion 45 fixed to its front end. The forward portion 43 of the arm 42 extends slidably into the cylinder 45. A compression spring 46 bears against the inner front wall of the cylinder 45 and against a pin 47 which transfixes the forward portion 43. Therefore, since the forward portion 43 is slidably disposed within the cylinder 45, violent accelerations or shocks exerted on the forward portion 43 will be absorbed by the compression spring 46.

Referring again to FIG. 4, car 13 rides on a track 10. A drive belt 20 lies between the tracks 10 and extends parallel to the tracks 10 between terminal points. However, as in the first embodiment of my invention, adjacent to terminal points, belt 20 describes a serpentine path, which may be either vertical, horizontal or spiral, as it passes about the pulleys 50 which are rotatably mounted on the shafts 51. The arm 42 pivots from side to side as projection 44 follows the serpentine path of the belt 20. As the downward projection 44 is violently accelerated when it passes about the pulleys 50 and the angle of the runs of belt 20 changes, a compression spring 46 absorbs these shocks. While I have shown one form of shock absorber on the arm 42, any suitable hydraulic or spring shock absorbing mechanism would be satisfactory.

Figure 6:
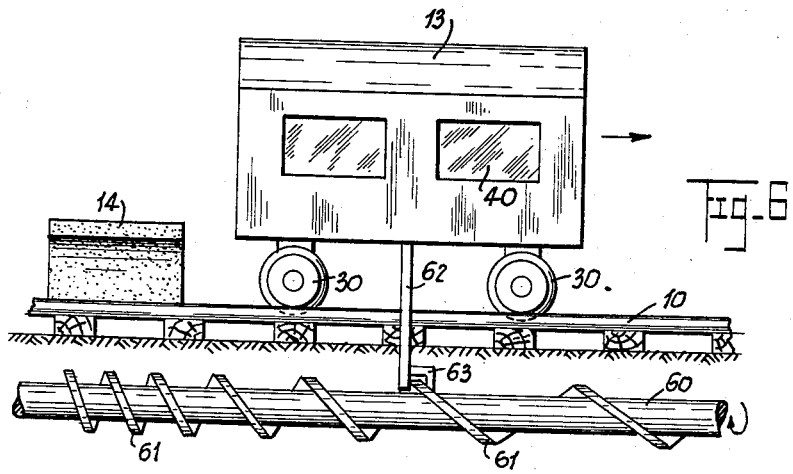
FIG. 6 is a side view of a fragment of a conveyor system showing a third embodiment of my invention.

Referring now to FIG. 6, a third embodiment of my invention operates as follows. Cars 13 roll along a track 10 on wheels 30. Extending parallel to the track 10 is at least one rotating shaft 60 carrying the single screw thread 61. The single thread 61, which extends about shaft 60, varies in its pitch so that it has a low pitch adjacent to the terminal points 14 and a high pitch along the right-of-way. A member 62 extends downward from each car 13 to engage the thread 61. Therefore, adjacent to the terminal points 15, the low pitch of the thread 61 will drive each car 13 slowly, while the high pitch of thread 61 along the right-of-way will accelerate each car 13 to drive it more rapidly. Since the cars 13 are accelerated and decelerated by the thread 61 as they leave and approach the terminal points 14, the member 62 may have a forward projection 63 so that thread 61 is engaged on both sides.

Figure 7:
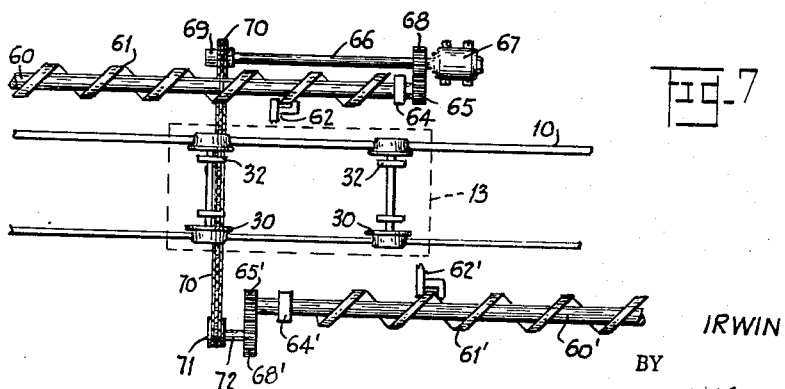
FIG. 7 is a top view of a fragment of the third embodiment of my invention with the body of a rail car shown in dotted lines.

Referring now to FIG. 7, the car 13 may be provided with two downward extensions 62 and 62' which, respectively, engage the threads 61 and 61' on the shafts 60 and 60'. The ends of shafts 60 and 60' are journaled in the bearings 64 and 64' and the ends of these shafts carry spur gears 65 and 65'. The bearings and the gears at the ends of the shafts 60 and 60' are of smaller diameter than the drive threads so the members 62 and 62' may pass over them. Shaft 66 is driven by a motor 67 and carries the gear 68 which drives gear 65 and thereby shaft 60. Shaft 66 also carries the sprocket 69 which drives the chain 70 and thereby the sprocket 71 which is mounted on shaft 72 and drives gear 68'. Thus the motor 67 drives both shafts 60 and 60' and their rotation is synchronized by the chain 70 and the sprockets 69 and 71.

Therefore, as the car 13 is driven to the right as shown in FIG. 7 by thread 61 engaging the downward extension 62, the downward extension 62' moves to the right until it also is engaged by the thread 61' on shaft 60'. As the downward extension 62 passes beyond the thread 61, car 13 is driven onward to the right by thread 61' which now engages the downward extension 62'.

Therefore, as shown in FIG. 7, a number of shafts 60 and 60' may be disposed on either side of a track 10 with the shafts 60 and 60' journaled in suitable bearings at their ends beyond the ends of the threads 61 and 61'. Furthermore, if the shafts 60 and 60' are of relatively short length, they may be disposed alongside a very gently curving track 10 so that this embodiment of my invention may drive a conveyor system about a closed loop of track.

Example I

A municipal rapid transit system two miles in length supplies passenger transportation along a busy street. Stations are located every 1000 feet. The station platforms are 132 feet long. The instation speed of the cars is 1.5 miles per hour, and the interstation speed is 12 miles per hour. The cars are accelerated when leaving the stations in 10 seconds and decelerate in 10 seconds. The cars spend one minute in passing through any station, ten seconds accelerating, forty-five seconds in transit between stations, and ten seconds decelerating, a total of 125 seconds per unit of 1132 feet of route travelled, for an overall speed of approximately 6 miles per hour, or four times the speed at which passengers may conveniently embark and disembark. Hence the total trip is accomplished in approximately 20 minutes which, in a congested area, is sometimes faster than vehicular transportation upon the streets.

Example II

A rapid transit system conveys passengers between stations 2500 feet apart at speeds up to 30 miles per hour. The loading platforms are 132 feet long, and the cars are 44 feet long. The loading and unloading speed is 1.5 miles per hour, and the average acceleration during periods of approach or departure from each station is 10,000 ft./min./min. Three cars are always within each station zone and each car requires one minute to traverse the length of the platform. Acceleration and deceleration during one cycle of operation require approximately 30 seconds, and the period of high speed lasts about 40 seconds. The entire cycle occurs at an average speed of approximately 14 miles per hour. No waiting time is required, and no labor is necessary for the operation of the system's individual conveyances, so that off-peak-hour traffic may be served with the same speed as peak-hour travel.

Example III

The system of Example II is applied to express service in which the distance between stations is two miles. The average speed of such a system is 23 miles per hour when accelerating and decelerating at 10,000 feet/min./min., with the mechanical arrangements described in Example II.

Example IV

A cable is used to drive a system such as a ski lift in which the variation between in station speed and interstation speed is on the order of twenty times. The cable is guided into a serpentine path at the station over pulleys six inches in diameter, and the total amplitude of the serpentine path is about 14.7 feet. The pulleys are on centers nine inches apart, as measured along the route. For each travel segment of 15 feet between reversals over successive guides, a point on the cable advances nine inches, for an average reduction of speed to one-twentieth of the true linear speed of the cable.

Example V

A variable-pitch screw is used to drive a conveyance whose driven member engages the screw. The screw is built so that in the sections between stations the pitch is 20 inches per revolution, while in the stations the pitch is 2 inches per revolution, for an overall ratio of speeds of 10 to 1. In the sections of right-of-way immediately preceding and following the station the pitch of the driving screw varies gradually between 20 and 2 inches. The follower, or driven member of the car engages the screw and is advanced at a speed proportional to the pitch of the screw. The spacing of the cars is such that they are substantially adjacent to each other in the stations and separated between stations. The actual spacing is determined by the number of grooves of the driving screw which separate the cars' driven members at their closest separation. The same number of grooves separates them while they move between stations at high speeds.

While I have disclosed my invention in the best forms known to me, it will nevertheless be understood that these are purely exemplary and that modifications in the construction, arrangement and combination of parts and the substitution of equivalents mechanically and otherwise, may be made without departing from the spirit of the invention except as it may be more particularly limited in the appended claims, wherein I claim.

1. A conveyor system comprising, in combination, separate movable units, at least one station on a path followed by said units, guide pulleys disposed in a vertical plane at one side of and adjacent said path and being staggered adjacent said station, a belt extending along said path and disposed in serpentine runs about said guide pulleys adjacent said station, means driving said belt about said path at a constant speed and means linking each of said units to said belt wherein said linking means comprise a vertical way mounted on each movable unit, a vertically slidable member secured by said way and an extension from said vertically slidable member connected to said belt.

2. The combination according to claim 1 in which said means driving said belt comprises motor means driving at least one of said guide pulleys.

3. A conveyor system comprising, in combination, rail cars, a closed loop of track on which said rail cars move, stations along said track, guide pulleys disposed adjacent said track and being staggered adjacent to said stations, a belt extending along said track and disposed in serpentine runs about said staggered guide pulleys, means driving said belt at a constant speed about said path, and an arm pivotally attached to each of said rail cars and to said belt so that said belt moves said rail cars about said closed loop of track.

4. The combination according to claim 3 with the addition of shock absorbing means along said arm.

5. A method of operating a cable driven conveyor system which comprises in combination the steps of engaging a conveyor unit and a moving drive cable, operating said cable at a constant speed, diverting the path of travel of said cable with respect to the path of said conveyor unit whereby said unit moves at a first velocity and thereafter operating said cable in the same path as said unit whereby said unit moves at a second and higher velocity.

6. A cable railway system comprising a constant speed driving cable, a conveyor unit moving along a track adjacent said cable and driven by said cable through a fixed connection thereto, said cable provided with means to move parallel to said track through a first zone of travel and means to move through a devious path in a second zone of travel whereby said unit moves at a slow speed in said second zone and at a high speed in said first zone and said cable moves at the same speed in both zones.

7. A conveyor system comprising, in combination, separate movable units, a closed path and means constraining said units to move on said path, at least one terminal portion of said path, guide pulleys disposed adjacent to said path, said guide pulleys being staggered adjacent to said terminal portion, a belt extending along said path and disposed in serpentine runs about said guide pulleys adjacent said terminal portion, means driving said belt about said path, and means linking each of said units to said belt.

8. A conveyor system comprising, in combination, separate movable units, a closed path and means constraining said units to move on said path, at least one terminal portion of said path, guide pulleys disposed in the same plane as said path said guide pulleys being being staggered adjacent to said terminal portion, a belt extending along said path and disposed in serpentine runs about said guide pulleys adjacent to said terminal portion, means driving said belt about said path, and means linking each of said units to said belt.

9. A cable driven conveyor system provided with conveyor units fixed to a cable at selected intervals which comprises means for constraining said units in a path, means for reducing the forward velocity of said cable in a selected zone along its path by lateral diversion of the cable, in combination with means for increasing the forward velocity of said cable in another zone along its path.

10. In a cable driven conveyor system comprising a conveyor unit engaging a drive cable, the improvement comprising means for driving said cable in a relatively straight path over a selected zone of travel to provide maximum forward speed for said conveyor unit in combination with means for driving said cable in a devious path over another selected zone of travel to provide a slower forward speed for said unit and means confining said units in a path.

11. A cable-driven conveyor system comprising, in combination, separate movable units, a path for said units, means confining said units in said path, at least one station on said path, cable drive means driving said units, a devious path for said drive means adjacent said station, said drive means moving said units slowly past said station and more rapidly beyond said station.

12. A cable conveyor system comprising, in combination, separate movable units, a path for said units, means confining said units in said path, at least one station on said path, cable means fixed to said units, a devious path for said cable means adjacent said station, said units moving slowly past said station and more rapidly beyond said station.

13. A cable conveyor system in which a conveyor unit is fixedly connected to a drive cable and which comprises both station zones of travel of said unit and between station zones of travel of said unit; said unit having the same forward direction of travel in both station zones and in between station zones; and the path of the drive cable through station zones being longer than the path of the unit through station zones, and means constraining said unit in said path.

References Cited in the file of this patent
UNITED STATES PATENTS

| | | |
|---|---|---|
| 428,639 | Siccardi | May 27, 1890 |
| 570,025 | Kennedy et al. | Oct. 27, 1896 |
| 761,484 | Hetzel | May 31, 1904 |
| 761,610 | Riblet | May 31, 1904 |
| 892,543 | Newerf | July 7, 1908 |
| 1,159,388 | Jacobs | Nov. 9, 1915 |
| 1,725,653 | Kruckenberg | Aug. 20, 1929 |
| 1,774,360 | Drengwitz | Aug. 26, 1930 |
| 1,793,498 | L'Heritier | Feb. 24, 1931 |
| 1,951,400 | Dvorak | Mar. 20, 1934 |
| 2,685,260 | Auger | Aug. 3, 1954 |
| 2,708,886 | Neely | May 24, 1955 |
| 2,728,238 | Paasche | Dec. 27, 1955 |
| 2,973,720 | Bourassa | Mar. 7, 1961 |